April 24, 1951 C. M. SAVRDA 2,550,025
FISH-FILLETING MACHINE
Filed Oct. 26, 1946 6 Sheets-Sheet 5
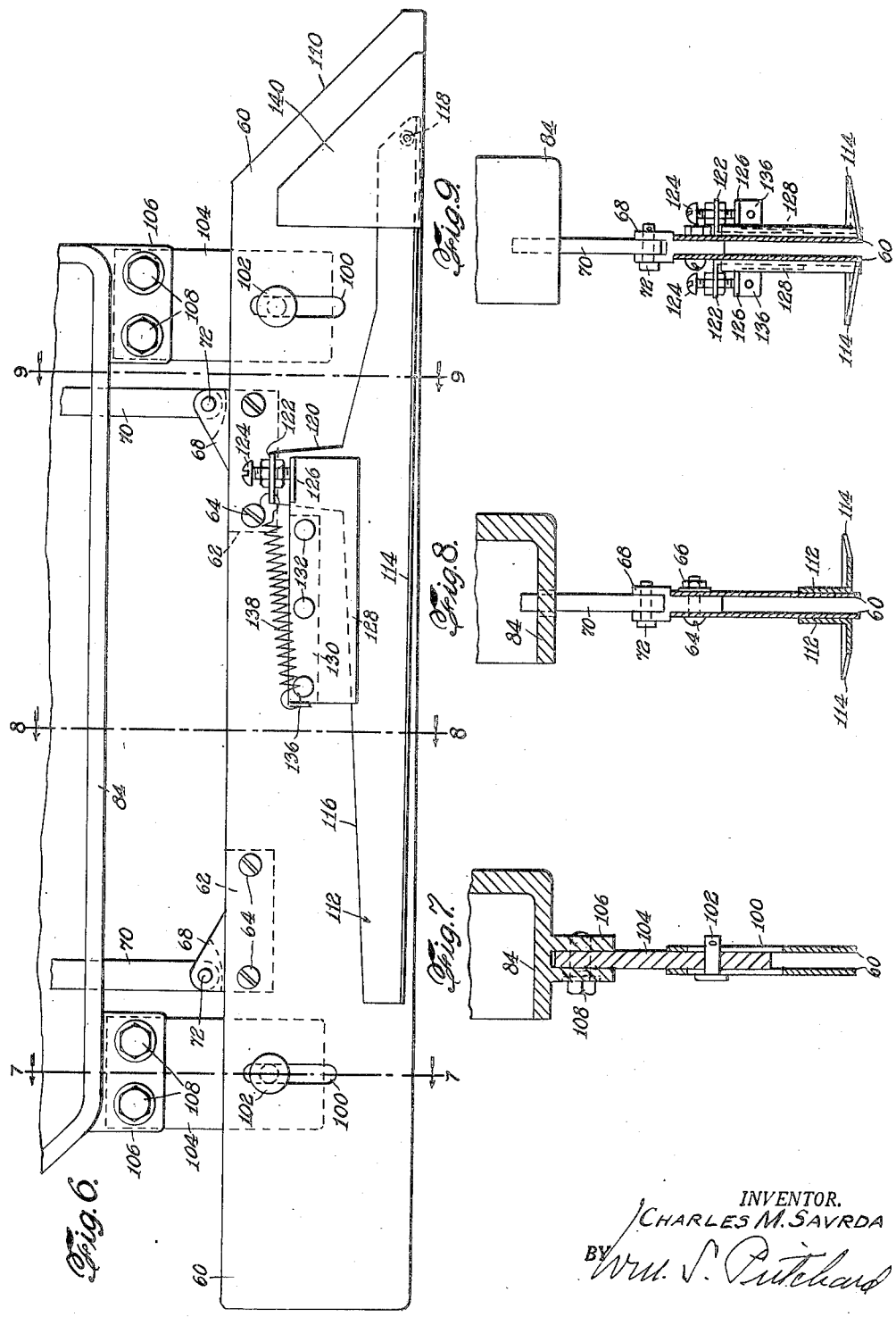
INVENTOR.
CHARLES M. SAVRDA
BY
ATTORNEY.

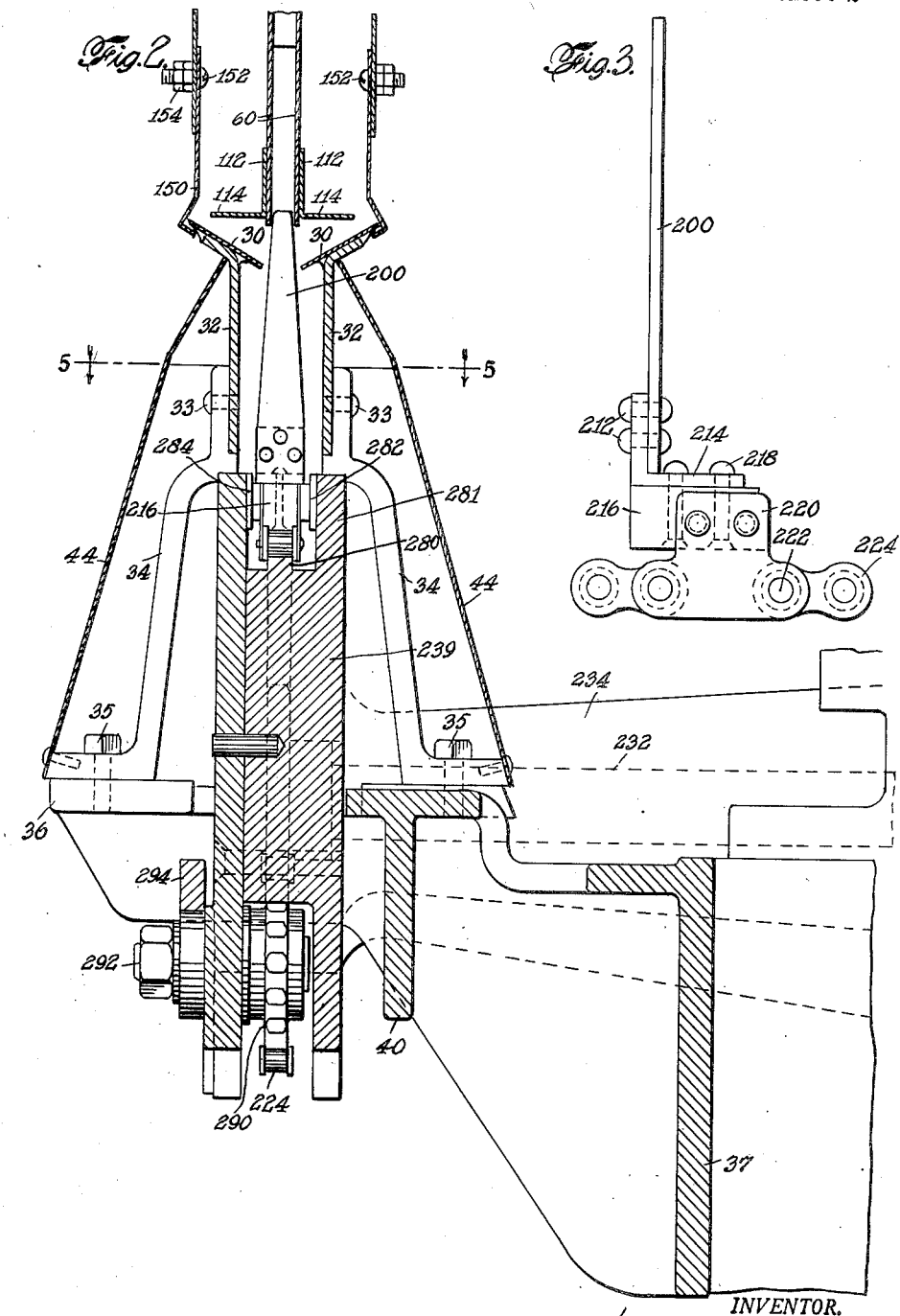

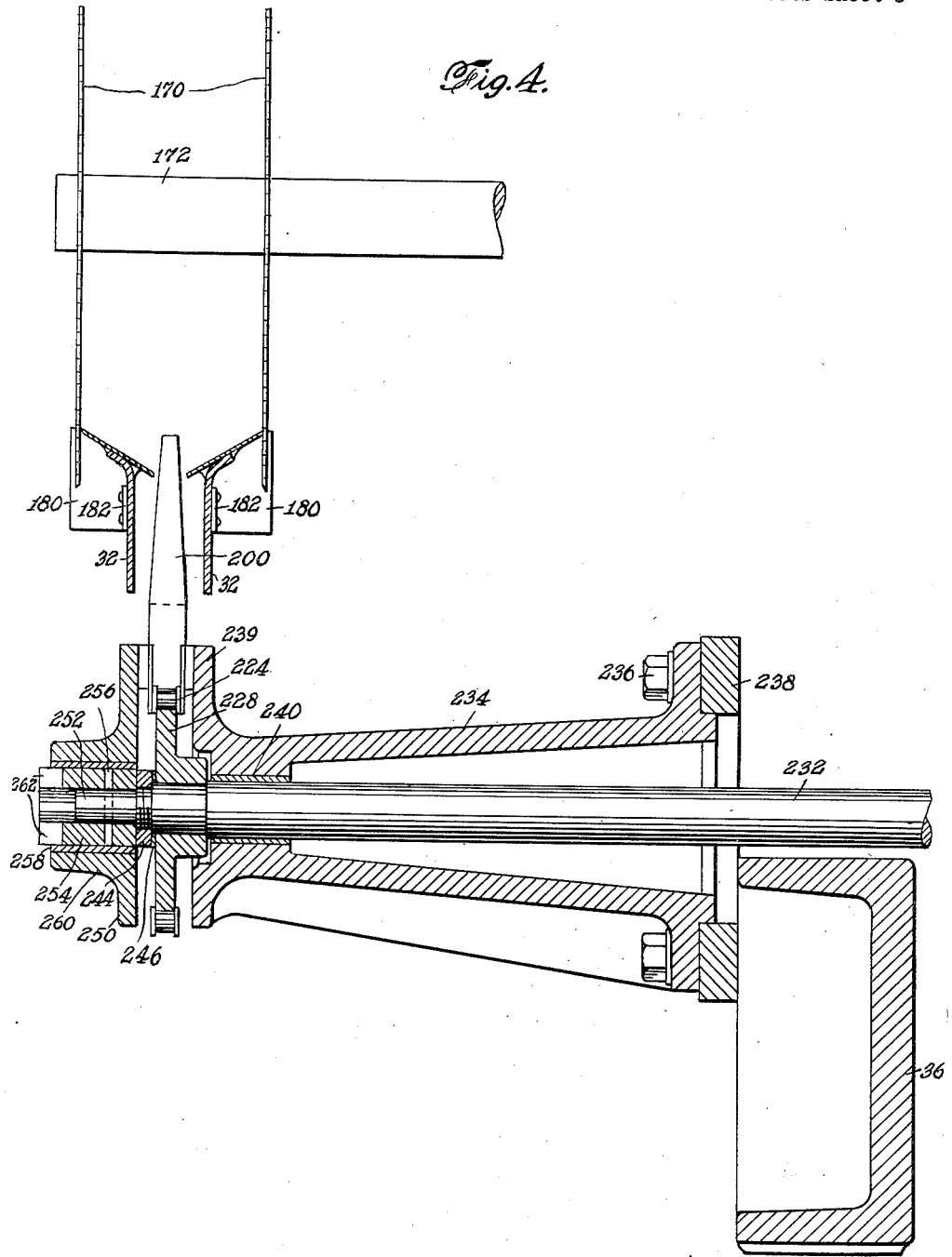

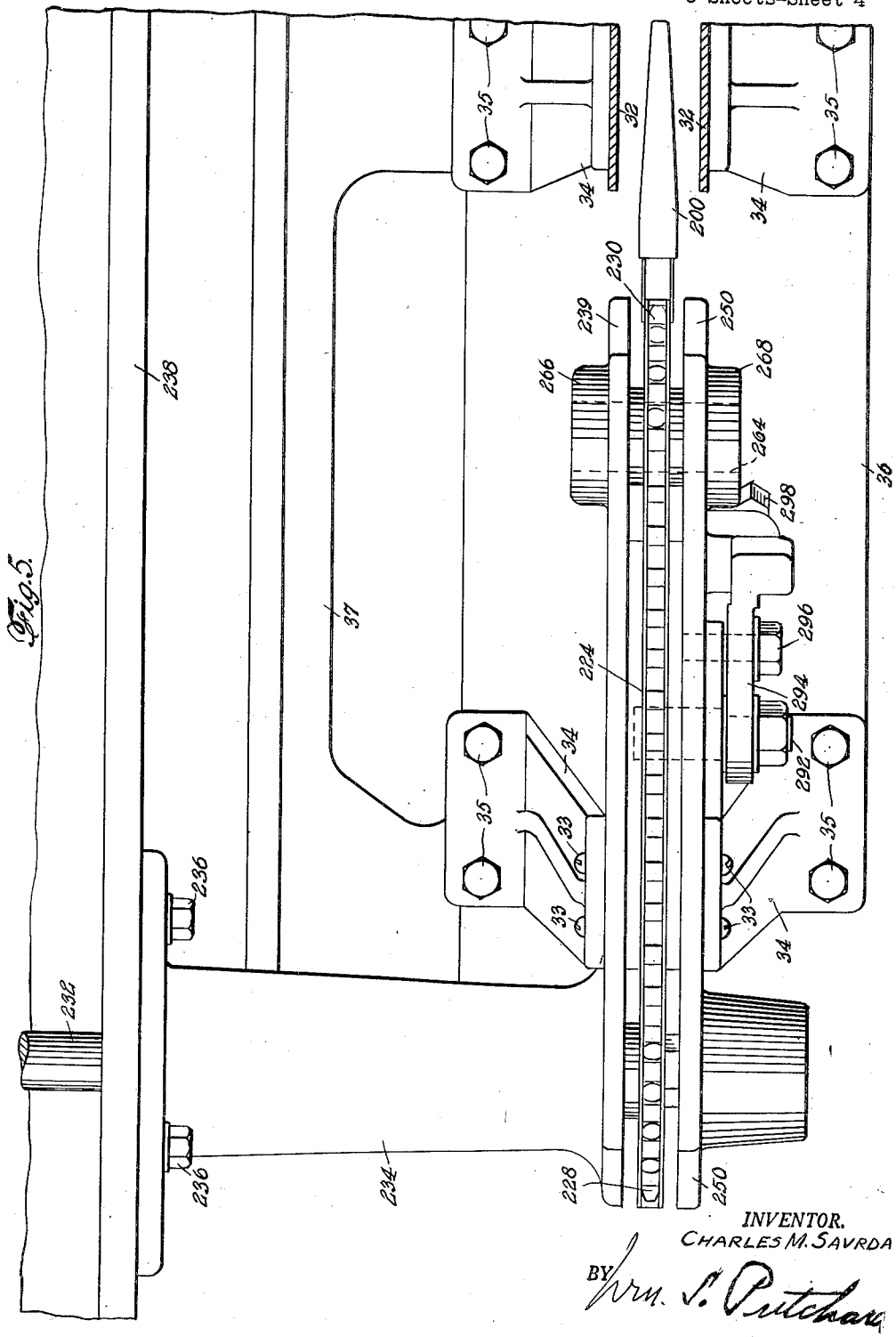

April 24, 1951
C. M. SAVRDA
2,550,025
FISH-FILLETING MACHINE
Filed Oct. 26, 1946
6 Sheets-Sheet 6
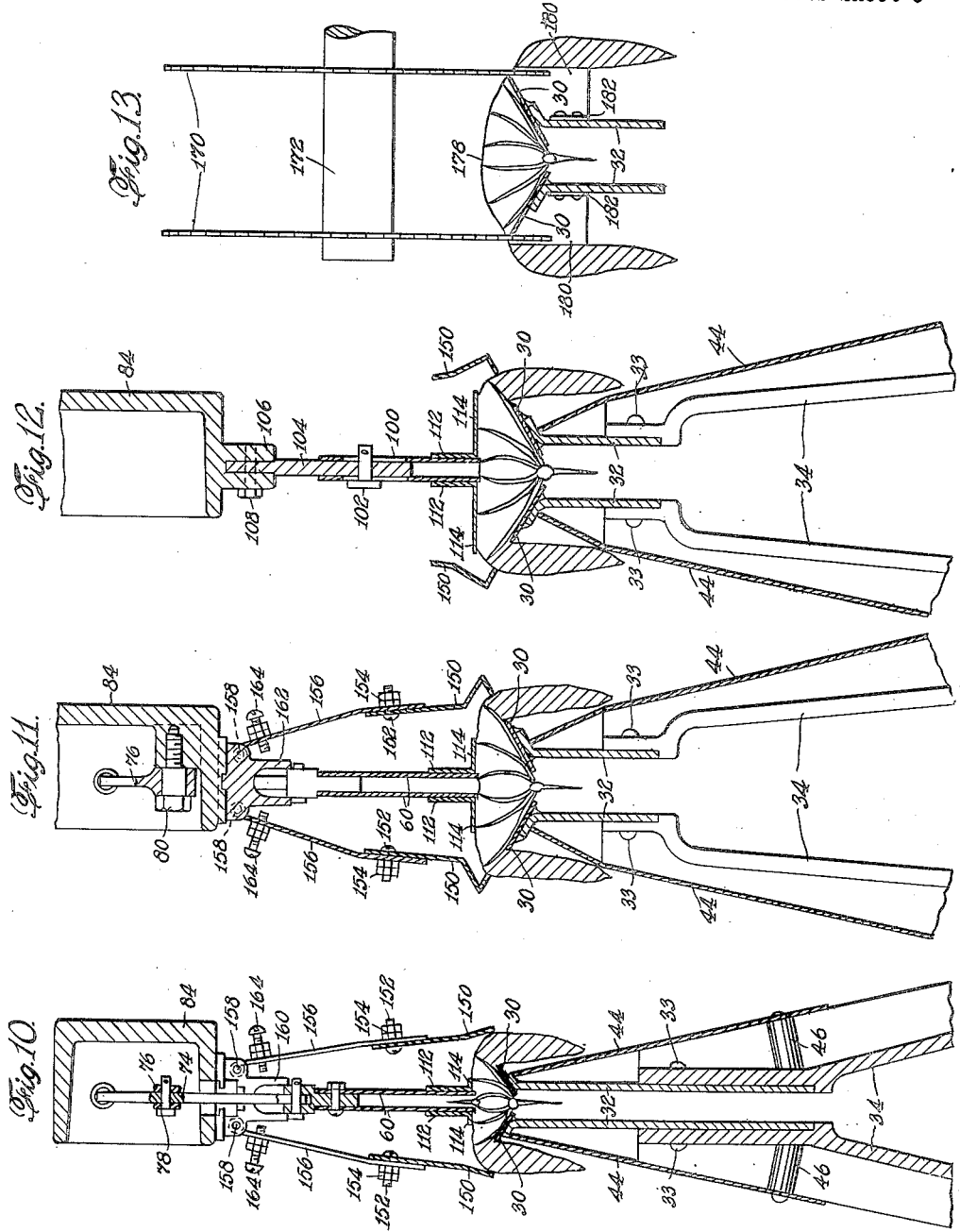
INVENTOR.
CHARLES M. SAVRDA
BY
*Wm. S. Pritchard*
ATTORNEY Patented Apr. 24, 1951

2,550,025

UNITED STATES PATENT OFFICE 2,550,025

FISH-FILLETING MACHINE

Charles M. Savrda, Bay Shore, N. Y., assignor, by mesne assignments, to Fish Machinery Corporation, Boston, Mass., a corporation of Delaware Application October 26, 1946, Serial No. 705,985

5 Claims. (Cl. 17—4)

This invention relates to an apparatus for treating fish. More particularly, it relates to a filleting machine having means to eject a fish which has stopped short on the ribbing knives.

Copending application of William H. Hunt for "Apparatus for and Method of Filleting Fish," Serial No. 698,097, filed September 20, 1946, discloses a fish-filleting machine particularly adapted for filleting rose fish and wherein, after a fish tail leading and back downward is incised in the unribbed thin portion of the fish between the tail and belly cavity upwardly from the back thereof to substantially through to the top, the ribbed portion of said fish is incised upwardly from the back until it is in close proximity to the ribs and, as the fish travels in a path approximating that which it would normally tend to assume upon projection from the zone where the back thereof was incised, the fillets are severed from the backbone and ribs to which the uncut belly and belly membrane are still attached.

In the aforementioned application, the back is slit by means of a pair of rotating circular knives over which the fish is fed tail leading and back downward. A pair of rotating hold-down discs cooperate with the back-incising means to maintain the fish in position on the back-slitting knives. The hold-down discs engage the belly side of the fish and are yieldingly mounted relative to the back-slitting knives whereby, as enlarged sections of the fish pass through the zone of action of the belly knives, the hold-down discs will be raised automatically to accommodate the enlarged portions without incising the belly side of the fish. The back-slitting knives and the hold-down discs rotate at high speeds, with the result that the fish is projected therefrom at a high speed onto a pair of spaced ribbing knives having cutting edges at the top thereof. The ribbing knives are substantially vertically disposed and substantially parallel at the forward portion and thereafter gradually diverge outwardly and upwardly from the forward extremity to the rear thereof. The ribbing knives are spaced from each other to provide a passage adjacent the bottom thereof in which the backbone of the fish passes. The ribbing knives are inclined downwardly so that they are disposed in position to permit the fish to assume approximately that path of travel which it tends to take upon leaving the zone of action of the back-slitting knives.

In the preferred modification of the aforementioned apparatus, a hold-down mechanism is provided to maintain the fish in proper position on the ribbing knives. However, no ribbing conveyer is necessary.

The circular cutting knives and the hold-down discs rotate at high speeds, with the result that the fish is projected at a high speed onto the ribbing knives. In general, the momentum imparted to the fish by its projection from between the circular cutting knives and the hold-down discs is sufficient to carry the fish over the entire length of the ribbing knives whereby the fillets are cut from the ribs and uncut belly membrane. Sometimes for some unexplainable reason the fish, after projection from the zone of action of the circular cutting knives and hold-down discs, does not travel over the entire length of the ribbing knives but stops short. When this occurs, the operation of the machine must be stopped and the fish removed from the ribbing knives. Such interruption of the operation of the machine reduces the capacity of the machine. Additionally, the fish which has been removed from the ribbing knives is only partly filleted and the filleting operation, if desired to be completed, must be effected by hand.

An object of this invention is to provide a filleting machine having means which will remove, without stopping the machine, any fish which has stopped short on the ribbing knives.

Another object of this invention is to provide a filleting machine having means which will cause a fish which has stopped short on the ribbing knives to complete its travel thereover whereby the filleting operation is completed.

Other and additional objects of the invention will become apparent hereinafter.

The objects of the invention are accomplished, in general, by an ejector blade carried on a conveyer located beneath the ribbing knives and travelling in a path so that the blade will enter the slit between the ribbing knives in which the backbone of the fish slides from the bottom thereof and travel longitudinally in said slit in the same direction as a fish passes thereover during the filleting operation.

The size of the ejector blade is such that the top portion thereof will engage the decapitated end of any fish which has stopped short on the ribbing knives. Due to this construction, movement of the ejector blade, which is effected by the conveyer, will cause any fish which has stopped short to be engaged thereby and to be fed over the ribbing knives to complete the filleting operation without stopping the machine.

The filleting machine is preferably provided with hold-down means whereby the fish is maintained in position on the ribbing knives and the ejector blade is designed to cooperate therewith.

Though the invention is capable of operation with filleting machines of various types, it will for convenience be described as applied to a filleting machine of the type and nature above briefly described and as shown in the aforementioned Hunt application.

The present invention may be more clearly understood by reference to the following detailed description when taken in connection with the accompanying drawings, wherein:

Figure 2 is a section taken on the line 2—2 of Figure 1, with the ejector blade shown between the ribbing knives and hold-down means;

Figure 3 is a side elevation of a detail showing the mounting of the ejector blade on the conveyer;

Figure 4 is a section taken on the line 4—4 of Figure 1;

Figure 5 is a section taken on the line 5—5 of Figure 2, partly broken away;

Figure 6 is a side elevation of the hold-down means, with the fillet-retaining means being omitted;

Figure 7 is a section taken on the line 7—7 of Figure 6;

Figure 8 is a section taken on the line 8—8 of Figure 6;

Figure 9 is a section taken on the line 9—9 of Figure 6; and

Figure 1:
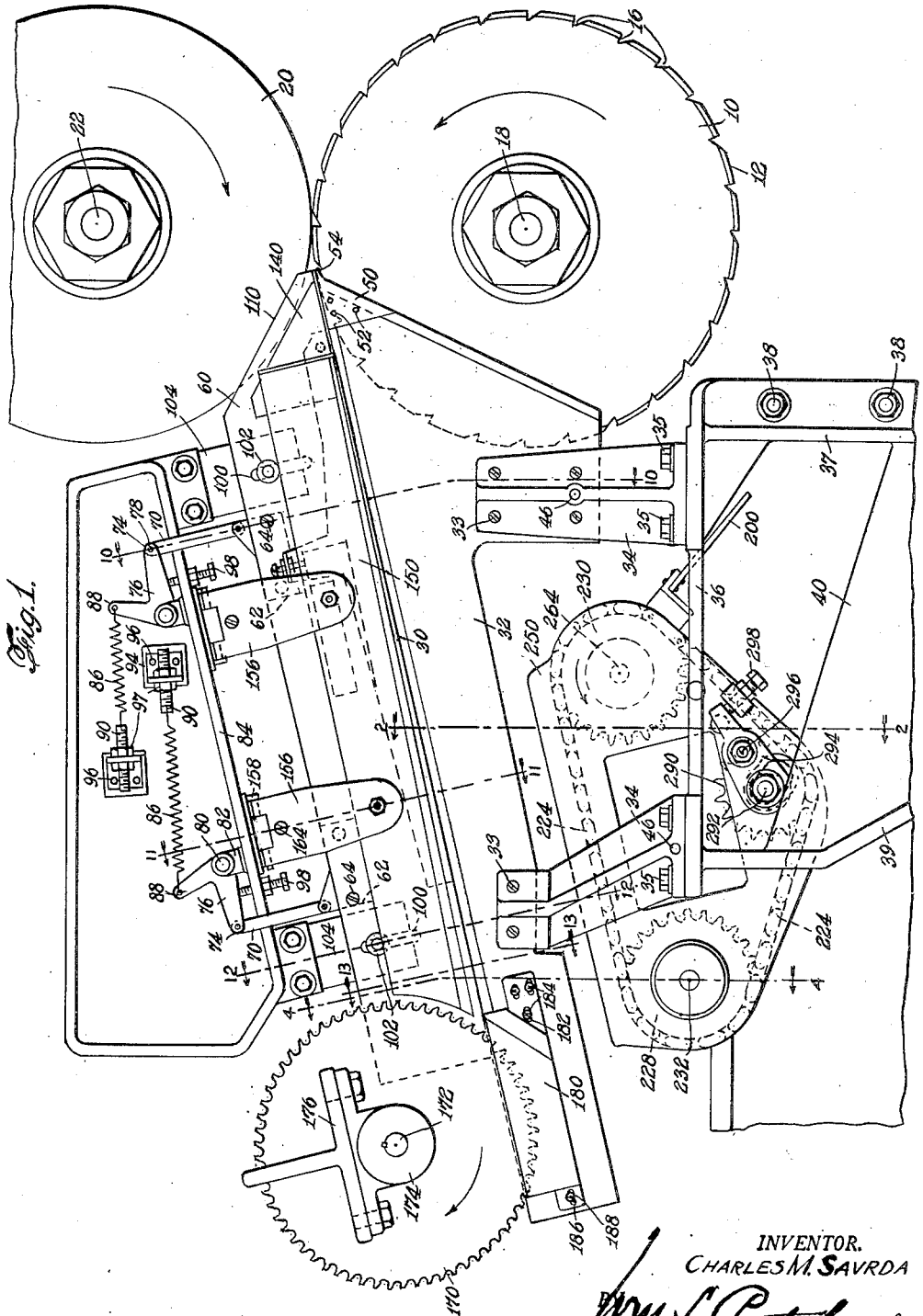
Figure 1 is a side elevation of a filleting machine embodying the invention, the ribbing knife shield being omitted.

Figures 10, 11, 12 and 13 are sections taken on the lines 10—10, 11—11, 12—12, and 13—13 respectively of Figure 1, and including a fish to show the filleting operations at such various positions in the machine.

Referring now to the drawings, wherein like reference numerals designate like parts, the reference numeral 10 designates a pair of spaced circular cutting knives which constitute the back-cutting knives. Each of the knives 10 is provided with a cutting edge 12 and a plurality of equally spaced peripheral notches 16. The cutting edge 12 is obtained by beveling the outer face of each circular knife 10. The knives 10 are rotatably mounted on a shaft 18 which is driven in any suitable manner (not shown).

Above the cutting knives 10, there is a pair of yieldingly mounted hold-down discs 20 which are rotatably mounted on a shaft 22 driven in any suitable manner (not shown). The hold-down discs 20 engage the belly side of the fish but make no incisions or slits therein.

In the preferred form of the invention, the back-cutting knives 10 and the hold-down discs 20 are mounted and operate in the manner more fully disclosed in the aforementioned Hunt application.

The back-slitting knives 10 and the hold-down discs 20 rotate at high speeds, with the result that, in addition to incising the back of a fish passing through the zone of action thereof, the fish is also projected from the zone of action thereof onto a pair of spaced, and preferably stationary, ribbing knives 30 which are in adjacent parallel position. As shown in Figure 1, the forward extremity of each of the ribbing knives 30 extends over or overlaps onto the outer surface of the cutting knives 10 adjacent thereto. The knives 30 are parallel at their forward ends and then diverge outwardly and upwardly. The knives 30 are secured, as by soldering, to a pair of spaced knife holders 32 which, in turn, are secured by screws 33 onto brackets 34 and which, in turn, are secured at the base thereof by screws 35 to a frame member 36. The frame member 36 is formed with a member 37, which is secured onto the main frame by bolts 38, and a member 39 which is appropriately secured onto the main frame by means not shown. The frame member 37 is also formed with a strengthening rib 40.

Upon projection of a fish from the zone of action of the rotating knives 10 and the rotating hold-down discs 20, the fish tends to assume a certain path of travel. Accordingly, the brackets 34 are of such sizes that when the knife holders 32 are secured thereto the slot formed by the knives 30, and in which the backbone rides, will be inclined downwardly and disposed in the position which approximates the path of travel which the fish tends to assume upon projection from the zone of action of the cutting knives 10. Preferably, a shield 44 extending from the knife holders is secured onto bosses 46 on the brackets 34.

The fish, due to the high speed at which it is projected from the zone of action of the cutting knives 10, will be caused to travel along the ribbing knives whereby the fillet is severed, the various stages of operation being shown in Figures 10–13 inclusive.

Sometimes the rotating back-cutting knives do not completely sever the section at the tail end of the fish, with the result that there remains an unsevered thin string of skin. If this thin string of skin is not severed, it will tend to prevent complete severance of the fillet from the skeleton. In order to sever this thin string, each knife blade 30, as shown in Figure 1, has a knife extension 50 which is secured thereto by means of rivets 52 and terminates in a sharp point 54 which overlaps onto the outer face of the adjacent cutting knife 10 in position to contact the thin thread of skin and sever the same.

In order to facilitate the filleting operation, there is provided a hold-down mechanism, which includes a belly fin guide, which also serves to center the fish. As shown in Figures 6–12 inclusive, the belly fin guide consists of a pair of plates 60 arranged in spaced relationship and yieldingly mounted in the machine, as will hereafter be more fully described, to permit the passage of the belly fin therebetween. The plates 60 constituting the belly fin guide are secured to a pair of spacers 62 positioned adjacent the top of and intermediate the plates by means of bolts 64 and nuts 66. Each of the spacers 62 is provided at the top thereof with a fork 68 which projects above the top edges of the plates 60. In each fork 68, one end of a link 70 is pivotally secured by a pin 72. The other end of the link 70 is secured in the bifurcated end 74 of the horizontal member 76 of a bell-crank lever by a pin 78. The bell-crank lever is pivotally mounted on a stud 80 secured in a boss 82 carried by a support 84 appropriately mounted on the frame of the machine.

As shown in Figure 1, one end of a spring 86 is secured to the free end of the other arm 88 of the bell-crank lever, and the other end of the spring 86 is secured to an adjusting screw 90 adjustably positioned in a bracket 94 appropriately secured on the support 84 by screws 96. Lock nuts 97 lock the screw 90 in adjusted position. The tension of the spring 86 is adjusted so as to permit the belly fin guide to fall downwardly by gravity. A stop screw 98 cooperates with the horizontal arm 76 of the bell-crank lever and serves to limit the downward movement of the plates 60.

As shown in Figure 1 of the drawings, each spacer 62 is respectively connected to a link 70 which, in turn, is connected respectively to a bell-crank provided with spring tension means 86 and an adjustable stop screw 98. The links 70 are of such dimensions as to suspend the belly fin guide in a vertical plane with the bottom edge parallel to but in spaced relationship to the slit between the ribbing knives in which the backbone passes. In other words, the belly fin guide is disposed so that the bottom thereof is in or parallel to the approximate path of travel which a fish tends to assume upon projection from the back-cutting knives 10 and hold-down discs 20.

In practice, the belly fin guide is positioned so that it will center the fish on the ribbing knives and exert a slight pressure on the fish in addition to guiding the belly fin.

Due to the mode of suspending the belly fin guide, the latter is yieldingly mounted and will be raised and lowered depending on the size of the fish passing over the ribbing knives. Further, due to the mode of suspending the belly fin guide, the latter can be moved at the forward end independently of the rear end, and vice versa.

In order to guide the belly fin guide in its up-and-down movement and also to provide pivots for the movement of the front or rear portions independently of the other, the plates 60 are provided with aligned slots 100 in which a pin 102 is slidably disposed. The pin 102 is carried by a plate 104 which is secured at its upper end by screws 108 in a bifurcated lug 106 on the support 84.

As shown in Figure 1, the belly fin guide is provided with pivot means, described in the preceding paragraph, adjacent to each of the belly fin guide yielding suspension means.

As also shown in Figure 1, the belly fin guide at its forward end overlaps on the adjacent outer faces of the hold-down discs 20. To facilitate the entrance of the belly fin, the belly fin guide is cut away at its forward end, as indicated by the reference numeral 110, so that it slopes downwardly and terminates in spaced relationship to the sharp pointed extremity 54 of the ribbing knives 30. The rear end of the belly fin guide extends beyond the rear end of the ribbing knives 30 and intermediate the cut-off knives, which will hereinafter be described.

The hold-down mechanism also includes rib guides, generally indicated by the reference numeral 112, which serve to bring the ribs of the fish in close relationship to the ribbing knives whereby maximum recovery can be obtained. As shown in Figures 8-12 inclusive, there are two rib guides, and the belly fin guide 60 is positioned intermediate thereof. Each rib guide 112 is pivotally and yieldingly mounted on the plate 60 of the belly fin guide plate adjacent thereto. Since each rib guide and means for pivotally and yieldingly mounting the same are identical, only one of such rib guides and the means for mounting the same will be described.

Each rib guide 112 is provided with a flange 114 which, as shown in Figures 8-12 inclusive, flares outwardly in the direction from the front to the rear thereof. In general, the flaring of the flange 114 is in accordance with the divergence of the ribbing knives 30. The shape of the upper edge 116 of the rib guide is not critical. In the form shown, the upper edge 116 is irregular. Adjacent the forward end, the rib guide 112 is pivotally mounted on a stud 118 secured in the plate 60 adjacent thereto. The rib guide 112 is provided with an extension 120 projecting from the upper edge thereof. The extension 120 is bent at 90° to form a support 122 for a stop screw 124.

The rib guide 112 is disposed on the outer face of the plate 60, and the stop screw 124 cooperates with a stop member 126 carried on a plate 128 disposed on the outer surface of the plate 60 and overlapping onto the projection 120. A spacer plate 130 is positioned intermediate the plate 128 and the plate 60 of the belly fin guide so that the plate 128 will lie flat. Rivets 132 secure the plate 128, the spacer 130 and the belly fin guide plate 60 together.

The plate 128 is provided with an ear 136 in which one end of a spring 138 is positioned. The other end of the spring is secured in a hole in the support 122 of the extension 120.

The spring 138 continuously urges the rib guide 112 to move about its pivot 118 in a counterclockwise direction, and the stop screw 124 which cooperates with the stop member 126 limits such counterclockwise movement.

At its forward end, the flange 114 is preferably positioned so that it lies in substantially the same transverse plane as the adjacent edge of the plate 60 and thereafter slopes lightly upwardly in a rearward direction with respect to the bottom edge of the plate 60 on which it is secured. It is clear that since the rib guide is positioned on the belly fin guide, up-and-down movement of the fin guide will also result in up-and-down movement of the rib guide carried thereon. However, due to the yielding and pivotal mounting of the rib guide on the belly fin guide, each rib guide is also movable about its pivot independently of the belly fin guide on which it is secured and the other rib guide.

The shape of the ends of the rib guide is not critical. In the form shown (see Figure 6), the forward end is cut away and is substantially parallel to the end 110 of the belly fin guide plate. A cover plate 140, positioned over the forward end and pivot of the rib guide, is appropriately secured, as by soldering, to the adjacent plate 60. The cover plate 140 prevents any part of a fish from being caught in the space at the forward end between the rib guide and the belly fin guide.

Each rib guide 112 is shorter in length than the plate 60 in which it is mounted, as is shown in Figure 6.

As previously mentioned, the flange 114 gradually flares upwardly in the direction from the front to the rear. At its rear, the flange 114 is of a width substantially equal to and preferably greater than the spread of the ribs.

As previously mentioned, the flange 114 gradually flares outwardly in the direction from the front to the rear. At its rear, the flange 114 is of a width substantially equal to and preferably greater than the spread of the ribs of the largest fish to be filleted by the machine and at which point such fillet is substantially cut from the ribs but held by the skin on the belly side of the fish. In the case of a small fish, the largest spread of the ribs will be at a point before the rear end of the flange 114, and the flange 114 will cooperate with fillet-retaining means, hereinafter described, to maintain the fish in position for the severing of the skin.

During operation, the rib guides exert a pressure on the belly side of the fish, with the result that the ribs are brought in close relationship with the ribbing knives and the fish tends to flatten. In order to retain the fish in position on the ribbing knives, there is provided a pair of fillet-retaining means. As shown in Figures 10, 11 and 12, there are two fillet-retaining means and, since both are identical and are mounted in the identical manner, only one of such fillet-retaining means and means for mounting the same will be described.

Each fillet-retaining means comprises a plate 150, the lower edge of which is provided with a bent hook end which progressively increases in size from the front to the rear of the machine, as shown in Figures 10, 11 and 12, so that the free end thereof will engage a fish substantially opposite to the ribbing knives and urge it thereon. Each fillet-retaining means 150 is appropriately secured, as by bolts 152 and nuts 154, to a pair of spaced hinged members 155, each of which is respectively hinged on a pivot 158 carried in a support 159 which, in turn, is secured to the support 64. The support 160 is provided with a yoke 162, which constitutes a stop member, and is adapted to cooperate with an adjustable stop screw 164 carried by the respective hinged members 156. Adjustment of the screws 164, the fillet-retaining means 150 is initially positioned as desired. The hinged members and the fillet-retaining means are made of a weight and so positioned that the fillet-retaining means will be, due to the action of gravity, urged inwardly and the fish maintained in position on the ribbing knives. As the fish increases in size during its passage on the ribbing knives, the hinged members will swing about their respective pivots in accordance with the size of the fish.

Each fillet-retaining means is mounted in the machine, as previously described, by two hinged elements. The fillet-retaining means are also mounted on an incline, as shown in Figure 1.

Each fillet-retaining means 150 is of a length that the forward end thereof is in the neighborhood of the forward end of the fin guide and the rear end terminates in close proximity to the cut-off knives 170. The rear ends of the fillet-retaining guides are arcuated on a radius from the center of the cut-off knives.

The cut-off knives 170 are mounted on a rotating shaft 172 carried in a bearing 174 appropriately mounted on a bearing support 176 appropriately mounted on the frame. The shaft on which the cut-off knives are mounted is driven by appropriate means (not shown). The cut-off knives, as shown in Figure 13, serve to completely sever the fillet from the skeleton to which the uncut belly cavity, designated by the reference numeral 178, is still attached.

Means (not shown) can be provided to receive the fillet after it has been completely severed by the cut-off knives.

In order to aid in the removal of the fillets, there is provided a stripper 180 which is positioned as shown in Figures 1, 4 and 13. The stripper is formed on a plate provided with a slot 182 in the ear 184 and a slot 186 in the ear 188. Bolts cooperating with the slots adjustably secure the stripper onto the knife holder 32.

In order to advance a fish which has stopped short on the ribbing knives 30, there is provided an ejector blade 200 which, as will be hereafter explained, is designed to move upwardly to enter in the slot between the ribbing knives 30 from the bottom thereof, travel longitudinally thereof in the direction of the passage of a fish over the ribbing knives, and, after leaving said slot, pass downwardly. The ejector blade, as shown in Figure 2, tapers in a direction toward the free end thereof and, at the bottom thereof, it is secured by means of rivets 212 to the vertical leg of a blade support 214, the horizontal leg of which is secured to a block 216 by screws 218. The block 216 is, in turn, secured between two lug side plates 220 which are carried on a pin 222 riveted in a link of a sprocket chain 224.

The sprocket chain 224 cooperates with a pair of spaced sprockets 228 and 230 disposed beneath the ribbing knives 30. The sprocket 228 is secured on a shaft 232 which is driven in any suitable manner by means not shown. The shaft 232 extends through a sleeve 234, the outer end of which is secured by bolts 236 to the frame member 238, and the inner end is formed with a plate support 239.

The sleeve 234, as shown in Figure 4, is provided with a sleeve bearing 240 in which the shaft 232 is rotatably mounted. The sprocket 228 is appropriately secured onto the shaft 232, and a lock nut 244 and lock washer 246 serve to maintain it in position. The shaft 232 extends beyond the lock nut 244 and through a cover plate 250, which is appropriately secured to the support 239. The free end 252 of the shaft 232 is secured in a bushing 254 by pins 256. The bushing 254 is rotatably disposed in a sleeve bearing 258 which is mounted in a bearing support 260 formed integral with the cover plate 250. The bushing 254 is provided with slots 262 which are adapted to cooperate with pins on a crank, whereby the shaft 232 may be rotated manually when this is desired.

The sprocket 230 is driven by the sprocket chain 224 through the medium of the sprocket 228. The sprocket 230 is appropriately secured on a shaft 264 which is rotatably mounted in bearings 266 and 268 carried by the support 239 and cover plate 250 respectively.

On its upper edge, the support 239, as shown in Figure 2, is provided with a chain roller guide 280 on which the sprocket chain 224 rides. The support 239 is also provided with a flange 281 on which an ejector finger block guide 282 is secured. The cover plate 250 is provided with an ejector finger block guide 284. The ejector finger block guides 282 and 284 are disposed opposite to each other and serve to guide the ejector finger block 216 during the travel of the sprocket chain from sprocket 230 to sprocket 228.

In the form shown, the sprockets 228 and 230 are of the same diameter, and the shafts 232 and 264 are positioned so that the sprocket chain 224 will pass from the sprocket 230 to the sprocket 228 in a line which is substantially parallel to the slot at the bottom and between the ribbing knives 30.

Due to the aforementioned construction, it is manifest that upon rotating the shaft 232, the sprocket chain 224 will be caused to move in a defined path and the ejector blade 200 will enter the slot between the ribbing knives from the bottom thereof. Continued movement of the sprocket chain 224 will cause the ejector blade 200 to pass longitudinally in the slot and engage anything which may have become lodged in such slot. In one embodiment, the path of the sprocket chain 224 is such that the ejector blade 200 will also be passed between the cut-off knives 170 before moving downwardly.

A sprocket chain tightener is preferably provided so that the sprocket chain will travel from the sprocket 230 to the sprocket 228 on the guide 280 in a substantially straight line. In the form shown (see Figures 1, 2 and 5), the sprocket chain tightener comprises an idler sprocket 290 which is rotatably mounted on a stud 292 carried at one end of a lever 294. The lever 294 is pivotally mounted on a stud 296 mounted in the cover plate 250. The free end of the lever 294 cooperates with a stop 298 adjustably mounted on the cover plate 250. By movement of the stop 298 in the appropriate direction, the lever 294 will be moved about its pivot 296 and the idler sprocket 290 may loosen or increase the tension on the sprocket chain 224.

Due to the details of construction, the support 239 and the cover plate 250 form a continuous channel in which the sprockets are positioned and in which the sprocket chain 224 travels. Preferably, the portion of the channel through which the ejector blade 200 travels while it is in active ejecting position is provided with the chain guide 280 and the ejector finger guides 232 and 234.

In general, the shaft 232 is continuously driven during operation of the machine. The speed of the sprocket chain 224 is such that the travel of the ejector blade between the ribbing knives will not interfere with the passage of any fish as it is projected from the zone of action of the back-cutting knives. The shaft need not be continuously driven. If desired, the shaft 232 can remain stationary until the need for the use of the ejector blade arises, at which time the shaft 232 can be driven either mechanically from some drive mechanism or manually, the pins of which are inserted in the slots 262 of the bushing 254. The manual operation of the shaft 232, as just described, is also utilized in adjusting the position of the ejector blade relative to the ribbing knives.

In the specific embodiment described, only one ejector blade has been disclosed. Though in general one ejector blade is sufficient, if desired any number of ejector blades arranged in spaced relationship on the chain can be utilized.

In operation, a fish, tail leading and back downward, and preferably decapitated, is projected from the zone of action of the cutting knives 10 and hold-down discs 20 onto the ribbing knives 30 and beneath the hold-down means, hereinbefore described. During operation of the machine, the shaft 232 is continuously driven, with the result that the sprocket chain continuously travels in the direction shown by the arrows in Figure 1. During such travel, the ejector blade 200 will enter the slot between the ribbing knives 30 from the bottom thereof and then travel longitudinally in the slot and pass downwardly from such slot in the neighborhood of the discharge end of the ribbing knives, whereby the fish will also be fed into the zone of action of the cut-off knives. If any fish has stopped short on the ribbing knives, the ejector blade will engage the rear end thereof and feed the fish over the ribbing knives and into the zone of action of the cut-off knives, whereby the filleting operation is completed without stopping or interrupting the machine. The fish is maintained in position on the ribbing knives by the hold-down means. In order to engage the fish substantially throughout its height at the place of contact, the ejector blade 200 is made of such a length that it will extend for a slight distance in between the fin guides, as shown in Figure 2.

Though the invention has been described in connection with a specific hold-down mechanism, it is to be understood that the invention is not restricted in its use with such a hold-down mechanism. Any type of hold-down mechanism may be used in combination with the ejecting mechanism herein described. Similarly, though the ejector mechanism has been described in combination with ribbing knives which are inclined, as hereinbefore described, it is to be understood that the invention is not restricted thereto. The ribbing knives need not be inclined, if so desired. In any construction, the top flight of the conveyer is parallel to the slit at the bottom of the ribbing knives.

Since it is obvious that many changes and modifications can be made in the above-described details without departing from the nature and spirit of the invention, it is to be understood that the invention is not to be limited thereto except as set forth in the appended claims.

I claim:

1. In a fish filleting machine having a pair of stationary ribbing knives having an entering and discharge end and extending upwardly and outwardly from lower edges which are substantially equidistantly spaced throughout a substantial portion of their lengths and having upper cutting edges which diverge from their entering to their discharge ends, said lower edges forming a slit between said knives in which the backbone of a fish forcibly impelled onto said ribbing knives, tail leading and back downward, rides, a pair of spaced fin guide members forming an open slot therebetween; the improvements which include the combination of an ejector blade, and conveyor means mounting said blade on said machine below said knives for movement of said blade into said slit and said slot in a position to engage the end of a fish which has stopped short on said ribbing knives and for movement longitudinally along said slit and slot in the same direction as a fish passes over said ribbing knives during the filleting operation, to propel any such stopped fish along said knives.

2. In a fish filleting machine as set forth in claim 1, further characterized in that the conveyor means moves the blade out of said slit and slot at a point adjacent to the discharge end of said ribbing knives for discharging any such stopped fish off of said ribbing knives.

3. In a fish filleting machine of the type claimed in claim 1, wherein the lower edges of the ribbing knives which form the slit are downwardly inclined from the entering end to the discharge end and wherein the conveyor means moves the ejector blade in said slit along a path of substantially the same downward inclination as said lower edges of said knives.

4. In a fish filleting machine of the type claimed in claim 1, wherein the conveyor means is an endless chain having its upper flight extending along and beneath said slit, said upper flight being substantially equidistantly spaced along its length from the equidistant lower edges of said ribbing knives.

5. In a fish filleting machine of the type claimed in claim 1, wherein the machine includes a pair of cut-off knives adjacent to the discharge end of the ribbing knives, and wherein the conveyor means moves the ejector blade in a path extending adjacent to said cut-off knives to discharge a stopped fish off said ribbing knives into the zone of action of said cut-off knives.

CHARLES M. SAVRDA.

REFERENCES CITED

The following references are of record in the file of this patent:

UNITED STATES PATENTS

| Number | Name | Date |
|---|---|---|
| 356,725 | Moses | Jan. 25, 1887 |
| 1,639,976 | Barry | Aug. 23, 1927 |
| 1,643,504 | Lea | Sept. 27, 1927 |
| 1,861,863 | Hunt | June 7, 1932 |
| 2,149,021 | Hunt | Feb. 28, 1939 |
| 2,397,158 | Savrda | Mar. 26, 1946 |